United States Patent
Mallik et al.

(10) Patent No.: US 7,870,559 B2
(45) Date of Patent: Jan. 11, 2011

(54) METHODS, SYSTEMS, AND COMPUTER PROGRAM PRODUCTS FOR CONTINUOUS AVAILABILITY OF NON-PERSISTENCE MESSAGES IN A DISTRIBUTED PLATFORM

(75) Inventors: Chandan Mallik, Montclair, NJ (US); Benjamin W. Herta, Poughquag, NY (US); J. Kevin Lowe, Jr., Dover, NJ (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 11/691,560

(22) Filed: Mar. 27, 2007

(65) Prior Publication Data

US 2008/0243990 A1 Oct. 2, 2008

(51) Int. Cl.
G06F 13/00 (2006.01)

(52) U.S. Cl. .................. 719/313; 719/314; 719/318; 709/238

(58) Field of Classification Search .............. 719/313, 719/314, 318; 709/238
See application file for complete search history.

(56) References Cited

U.S. PATENT DOCUMENTS

| | | | |
|---|---|---|---|
| 5,996,001 | A | 11/1999 | Quarles et al. |
| 6,101,545 | A | 8/2000 | Balcerowski et al. |
| 6,496,496 | B1 | 12/2002 | Ramakrishna et al. |
| 2003/0095535 | A1 | 5/2003 | Le et al. |
| 2004/0205770 | A1 | 10/2004 | Zhang et al. |
| 2004/0236780 | A1 | 11/2004 | Blevins et al. |
| 2005/0078660 | A1 | 4/2005 | Wood |
| 2006/0031586 | A1 | 2/2006 | Sethi et al. |
| 2006/0080670 | A1 | 4/2006 | Lomet |
| 2006/0200829 | A1 | 9/2006 | Astl et al. |
| 2006/0230177 | A1 | 10/2006 | Braithwaite et al. |
| 2007/0204275 | A1* | 8/2007 | Alshab et al. .............. 719/313 |
| 2008/0256553 | A1* | 10/2008 | Cullen .......................... 719/313 |

OTHER PUBLICATIONS

Eiko Yoneki, Many Aspects of Reliabilities in a Distributed Mobile Messaging Middleware over JMS, R. Meersman and Z. Tari (Eds.): OTM Workshops 2003, LNCS 2889, Copyright Springer-Verlag Berlin Heidelberg 2003, pp. 934-949.

Arnas Kupsys, et al., Towards JMS Compliant Group Communication, Ecole Polytechnique Federale de Lausanne (EPFL), CH-1015 Lausanne, Switzerland, 10 pages.

* cited by examiner

*Primary Examiner*—Andy Ho
(74) *Attorney, Agent, or Firm*—Cantor Colburn LLP; Ronald Kaschak

(57) ABSTRACT

A method, system, and computer program product for continuous availability of non-persistence messages in a distributed platform are provided. The method includes providing a first client application independently in operative communication with at least two servers via a first client abstraction layer, generating a critical message by the first client application, duplicating the critical message at the first client abstraction layer for each of the servers, and transmitting the duplicate critical messages independently to each of the servers. The method further includes providing a second client application independently in operative communication with each of the servers via a second client abstraction layer, receiving one or more of the duplicate critical messages at the second client abstraction layer, selecting a critical message from the one or more duplicate critical messages, and delivering the selected critical message to the second client application.

20 Claims, 2 Drawing Sheets

METHODS, SYSTEMS, AND COMPUTER PROGRAM PRODUCTS FOR CONTINUOUS AVAILABILITY OF NON-PERSISTENCE MESSAGES IN A DISTRIBUTED PLATFORM

BACKGROUND OF THE INVENTION

The present disclosure relates generally to reliable communication systems and, in particular, to methods, systems, and computer program products for continuous availability of non-persistence messages in a distributed platform.

In a real-time or near real-time computing environment, messages sent and received between system components in a distributed platform must have a minimal delay while providing reliable communication. An example of such an environment is a 300 mm semiconductor fabrication (FAB) manufacturing environment. Such demanding environments cannot afford to lose critical messages or tolerate extended delays, which could result in halting operation and potentially damaging equipment or products. Critical messages may include control commands, health status, or other information necessary for proper system performance. A common technique employed to send messages between a source and target application is through message queue (MQ) communication. One approach to providing reliable MQ messaging is through persistent messages. Persistent messages may be stored by the message transmitter to ensure that in the event of a failed communication attempt, the message can be resent. While the use of persistent messages can increase system reliability, persistent messages may be unsuitable for a real-time or near real-time environment as there is additional delay introduced through persistent messages. For example, a near real-time system may require a maximum latency of 100 milliseconds to maintain system integrity; however, persistent messages may have a latency of 1 to 2 seconds. In a long delay period, critical messages may be lost or overwritten as new messages can arrive before existing messages are processed.

Another approach to providing reliable system performance for critical applications is through the use of high availability cluster multi-processing (HACMP). While HACMP may be effective at providing reliable system performance, the delays required can exceed 2 to 3 minutes for recovery when a system failure occurs. During this delay period, other system components may timeout resulting a larger scale impact, including a potential loss of revenue in a manufacturing environment. HACMP systems can be very expensive to implement, and thus not warrant the expenditure depending upon the revenue generating potential of the operating environment. HACMP systems can provide a high degree of availability, but fault recovery delays and implementation expense make them unsuitable for near real-time, cost-sensitive environments.

Many existing approaches to provide a high degree of system reliability and availability are not well suited to real-time or near real-time environments. Other considerations in systems that use backup storage and recovery approaches include indeterminacy of recovery time. That is, some systems may recover in a timely fashion upon certain failures, while recovery may take longer for different failure modes. The risk of a system failing to recover in a timely fashion for a large range of failures makes such a system unsuitable for critical applications that cannot afford downtime. Another factor that must be considered in a high availability system is the ability to perform system maintenance and upgrades without bringing the entire system offline. System components such as remote clients must still be able to communicate with other clients in a distributed platform, while maintaining a rapid response time and not losing critical messages.

What is needed, therefore, is a way to provide continuous availability of messages without relying on message persistence in a distributed platform.

BRIEF SUMMARY OF THE INVENTION

Embodiments of the invention include a method for communicating a critical message. The method includes providing a first client application independently in operative communication with at least two servers via a first client abstraction layer, generating a critical message by the first client application, duplicating the critical message at the first client abstraction layer for each of the servers, and transmitting the duplicate critical messages independently to each of the servers. The method further includes providing a second client application independently in operative communication with each of the servers via a second client abstraction layer, receiving one or more of the duplicate critical messages at the second client abstraction layer, selecting a critical message from the one or more duplicate critical messages, and delivering the selected critical message to the second client application.

Additional embodiments include a system for communicating a critical message. The system includes two or more servers, a first client system, and a second client system. The first client system executes a first client application. The first client application is independently in operative communication with the servers via a first client abstraction layer. The first client application generates a critical message. The first client abstraction layer performs a method. The method includes duplicating the critical message for each of the servers and transmitting the duplicate critical messages independently to each of the servers. The second client system executes a second client application. The second client application is independently in operative communication with the servers via a second client abstraction layer. The second client abstraction layer performs a method. The method includes receiving one or more of the duplicate critical messages, selecting a critical message from the one or more duplicate critical messages, and delivering the selected critical message to the second client application.

Further embodiments include a computer program product for transmitting and receiving a critical message between a first and second client application. The first client application is independently in operative communication with at least two servers via a first client abstraction layer. The second client application is independently in operative communication with each of the servers via a second client abstraction layer. The computer program product including instructions for causing a computer to implement a method. The method includes receiving a critical message from the first client application at the first client abstraction layer, duplicating the critical message for each of the servers at the first client abstraction layer, and transmitting the duplicate critical messages from the first client abstraction layer independently to each of the servers. The method further includes receiving at the first client abstraction layer one or more duplicate critical messages from the second client abstraction layer, selecting a critical message from the one or more duplicate critical messages, and delivering the selected critical message to the first client application.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Disclosed herein are methods, systems, and computer program products for continuous availability of non-persistence messages in a distributed platform. Through the use of multiple servers operating independently, a first client system may write duplicates of a critical message to the multiple servers for delivery to a second client system. In the event that one of the communication channels fails, at least one copy of the critical message will be delivered through the system. In exemplary embodiments, each server operates as a message queue (MQ) hub, such as an IBMS WebSphere MQ environment. Using a redundant message delivery approach enables high reliability operation without the added complexity or delays associated with persistent messages or high availability cluster multi-processing (HACMP). By adding a client abstraction layer to interface between each client system application and the multiple servers, the use of redundant messages is transparent to the client system applications, providing flexibility to support a wide variety of client system applications written in various programming languages, such as Java, C, C++, Visual Basic, or other programming languages known in the art. In exemplary embodiments, a client abstraction layer is linked to a client application using a common application programming interface (API) as presented through existing communication libraries, providing compatibility with a wide range of applications while increasing system communication reliability. The client abstraction layer may be embodied in a dynamically-linked library (DLL), an application plug-in, a module or class linked at build-time or run-time, or any other technique known in the art.

Figure 1:
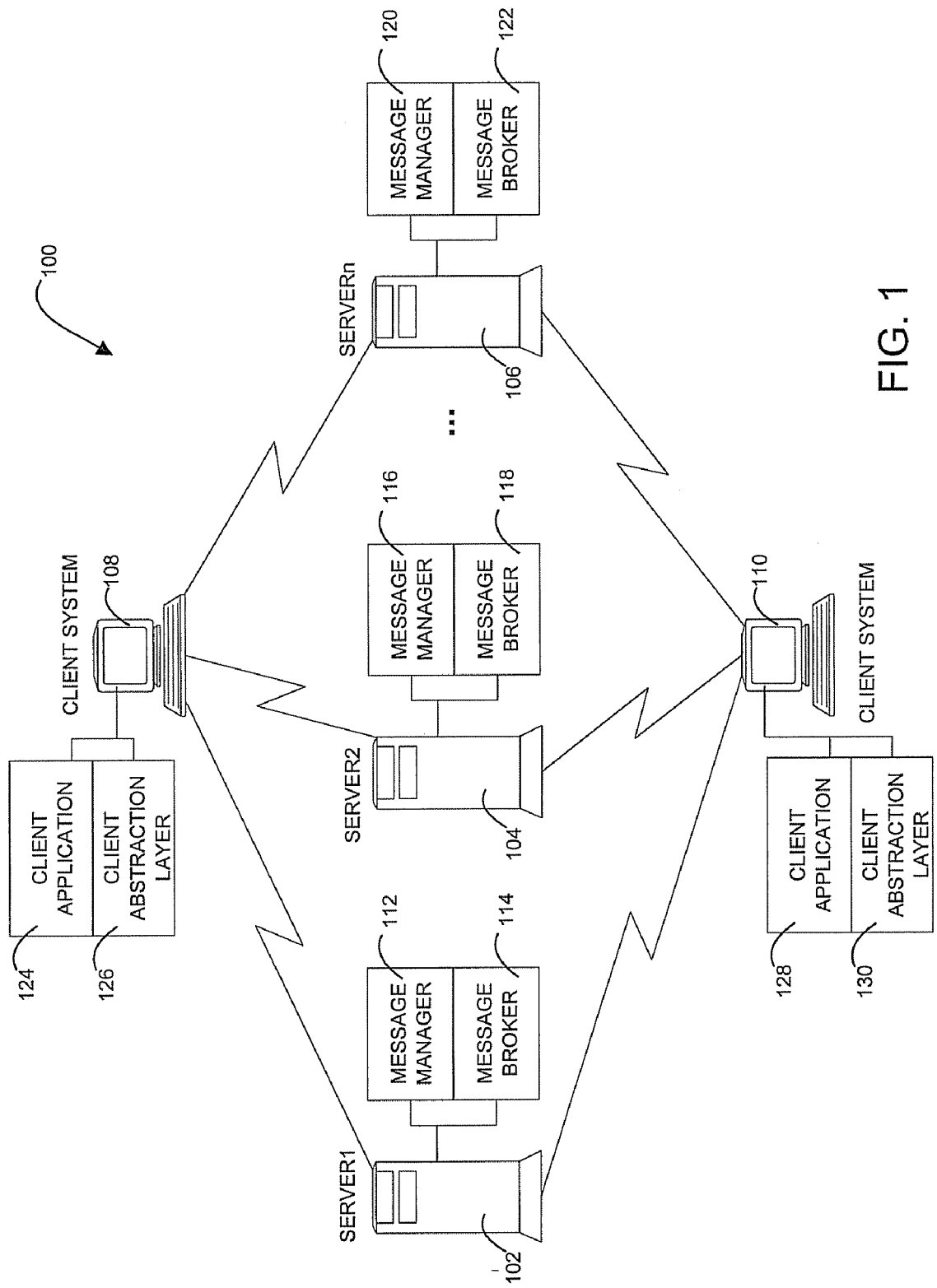
FIG. 1 depicts a portion of a system upon which continuous availability of non-persistence messages in a distributed platform may be implemented in exemplary embodiments.

Turning now to FIG. 1, an exemplary system 100 for continuous availability of non-persistence messages will now be described. The system 100 may be representative of a wide variety of operating environments, such as an automated manufacturing environment. The system 100 of FIG. 1 includes multiple servers (1 to n) 102-106 in independent communication with a first client system 108 and a second client system 10 via any suitable communications technologies (including wireline and wireless). The servers 102-106 may include one or more high-speed processors for handling a large volume of communication processing activities as well as performing other functions, such as production related activities typically found in a manufacturing facility. For example, in an automated integrated circuit (IC) fabrication facility (FAB), such as a facility for processing 300 mm wafers, the servers 102-106 may execute an automated manufacturing execution system (MES), such as an IBM® ITS SiView Standard MES. The servers 102-106 may be part of a larger system, such as an MQ cluster.

In exemplary embodiments, the server 102 executes a message manager 112 and a message broker 14. The message manager 12 may perform message management functions such as storing and forwarding messages between client systems 108 and 110, providing an underlying transport infrastructure (e.g., timing, triggering, temporary storage, etc.). Messages may be stored temporarily during message transport in a queue, a stack, a buffer, registers, or any other temporary storage known in the art. The message broker 114 may provide content and topic-based message routing using various models such as source/target (e.g., point-to-point) or publisher/subscriber. In a source/target model, a client system, such as the client system 108 may send a specific message targeted for another client system, such as the client system 110. The client system 108 may initiate a message transfer in response to a stimulus, based upon a schedule, or in response to a request from the client system 110. In a publisher/subscriber model, the client system 108 may publish or broadcast information generally to the server 102 through the message manager 112 and the message broker 114. The client system 110 may subscribe to the message stream originating from the client 108 through communicating a subscription request to the message broker 114, and in response to the subscription request, the message broker 114 may route messages from the client system 108 to the client system 110. Although the message manager 112 and the message broker 114 are depicted separately, it will be understood that the message manager 112 and the message broker 114 may be combined.

In exemplary embodiments, each server 102-106 operates independently using substantially similar hardware and software configurations. For example, message manager 116 executing on the server 104 may be functionally equivalent to message manager 120 executing on the server 106, and the message manager 112 as previously described. Similarly, message broker 118 executing on the server 104 may be functionally equivalent to message broker 122 executing on the server 106, and the message broker 114 as previously described. While there may be slight variations (e.g., different versions or revisions of hardware and/or software) between each server 102-106 and their associated message managers and brokers 112-122, the use of a common design may simplify the system design and maintenance, while reducing the overall cost. The independent operation of the servers 102-106, allows any combination of the servers to fail without propagating failures to the other servers 102-106 in the system 100. The independent operation of the servers 102-106 further enables maintenance or upgrades of any of the servers 102-106 while maintaining at least one communication path between the client systems 108 and 110.

The client systems 108 and 110 may comprise general-purpose computer processing devices that generate data and processing requests. Alternatively, the client systems 108 and 110 may be computer resources integrated with or embedded within a manufacturing system, such as a MES. In exemplary embodiments, the client system 108 executes a client application 124 and a client abstraction layer 126. Similarly, the client system 110 executes a client application 128 and a client abstraction layer 130. In alternate exemplary embodiments, the client applications 124 and 128 and the client abstraction layers 126 and 130 are executed upon any combination of the servers 102-106, with graphical user interfaces (GUIs) executing upon the client systems 108 and 110 providing a user interface to each of the client applications 124 and 128 (e.g., a thin client architecture). The client applications 124 and 128 can exchange information by transmitting and receiving messages through their respective client abstraction layers 126 and 130 and the servers 102-106. Although only two client systems 108 and 110 are depicted in the system 100 of FIG. 1, it will be understood that any number of clients executing any number of applications may be supported. In exemplary embodiments, the system 100 is a real-time or near real-time system, exchanging critical messages between the client applications 124 and 128. For example, the client application 124 may be a data gathering application, and the client application 128 may be a real-time fault detection and reporting application. A critical message may be time sensitive and/or contain information that cannot afford to be lost (e.g., control feedback data transmitted at an interval of 100 milliseconds or less). Although the client abstraction layers 126 and 130 are depicted as separate instances on separate client systems 108 and 110, the client abstraction layers 126 and 130 may include the same executable instructions and/or logic functions, supporting a common transmit and receive communication scheme.

In exemplary embodiments, when the client application 124 sends a critical message, the critical message is passed to the client abstraction layer 126. The client abstraction layer 126 duplicates the critical message, creating a copy for each server 102-106. If a large number of servers are available in the system 100, the client abstraction layer 126 may target a subset of the available servers to reduce network traffic. To maintain a high level of availability and ensure delivery of critical messages, it is preferable to communicate with at least three servers 102-106. Once the client abstraction layer 126 has created duplicate critical messages, the duplicate critical messages are independently transmitted to each of the servers 102-106, such that each server 102-106 may receive a copy of the critical message. The independence in communication between the client abstraction layer 126 and the servers 102-106 allows communication to continue with any non-failed servers 102-106 even if a failure occurs on one or more of the servers 102-106. As previously described, the message managers and message brokers 112-122 of each server 102-106 work together on a per server basis (e.g., message manager 116 with message broker 118 on server 104) to control message routing and provide temporary storage as messages pass through each server 102-106.

In exemplary embodiments, the client abstraction layer 130 receives the duplicate critical messages from the servers 102-106. The client abstraction layer 130 may employ a variety of techniques to determine which of the duplicate critical messages to select and pass to the client application 128. In exemplary embodiments, the client abstraction layer 130 compares the duplicate critical messages a pair at a time until a matching pair is found. Duplicate critical messages may be analyzed based on the entire message or on part of the message (e.g., a message identifier (ID) or header). One of the duplicate critical messages from the matching pair may be selected and passed to the client application 128 as the selected critical message. All remaining duplicate messages can be deleted or otherwise discarded at the client abstraction layer 130. In alternate exemplary embodiments, the client abstraction layer 130 performs an integrity check upon the received duplicate critical messages, selecting one of the duplicate critical messages with a passing integrity check and discarding or otherwise deleting each of the non-selected duplicate critical messages. In alternate exemplary embodiments, the client abstraction layer 130 checks the received duplicate critical messages for an expected message ID, selecting a duplicate critical message with a matching message ID, and deleting all other duplicate critical messages. Message deletion may include removing or resetting a reference pointer to each non-selected duplicate critical message. Alternatively, message deletion may include zeroing or otherwise altering the contents of each of the non-selected duplicate critical messages.

Sending duplicates of a critical message in parallel to the servers 102-106 may increase system reliability and availability. When a server or communication path fails through the system 100, there is a high probability that one or more of the duplicate messages will be delivered due to the use of alternate parallel paths. Therefore, one of the servers 102-106 can be taken offline for maintenance or upgrades (e.g., a software upgrade of the server 102) without a loss or interruption in communication between client applications 124 and 128. The increased probability of a successful critical message delivery through the parallel paths removes the need for message persistence as a backup, thus reducing system latency and enabling real-time or near real-time communication while providing high reliability. In exemplary embodiments, since the system 100 does not have to monitor and react to a failed server or communication link, in contrast to other systems such as HACMP systems, the system 100 can maintain real-time or near real-time communication without variable delays associated with extensive fault analysis and recovery logic. For example, assuming that the system 100 includes three servers 102-106, if server 106 fails, critical messages between client applications 124 and 128 can still pass through servers 102 and 104. Thus, even though the client abstraction layer 126 may be transmitting three duplicate critical messages, one targeted to each server 102-106, the client abstraction layer 130 can select one of the duplicate critical messages from the pair of duplicate critical messages received from the servers 102 and 104 to deliver to the client application 128, ignoring absent or erroneous messages from the server 106. In exemplary embodiments, so long as any pair of communication paths and servers 102-106 are functional, the system 100 can maintain real-time or near real-time critical message delivery between client applications 124 and 128.

In alternate exemplary embodiments, the critical messages transmitted through the servers 102-106 include integrity verification information. The integrity verification information may include any form of integrity verification known in the art, such as a cyclic redundancy check (CRC), a longitudinal redundancy check (LRC), a horizontal and/or vertical parity check, a checksum, or an error correction code (ECC). When a critical message includes integrity verification information, enhanced reliability may be achieved, at the expense of increased computational burden to verify and/or correct errors within the critical messages. In a system with three or more servers, such as servers 102-106, redundant critical message selection may be performed through cross-comparing the messages received from different servers to determine that a matching pair has been received, providing a high level of confidence that no errors exist in the matching pair while avoiding the use of more complex integrity verification schemes. Alternatively, in a system with only two servers available, it may be preferable to incorporate integrity verification information with duplicate critical messages such that if one communication path and/or server fails, data integrity can be monitored and verified on the remaining communication path.

In systems with tighter timing constraints and/or less processing capability, message identification (e.g., received message ID equals expected message ID) may be used to select a duplicate critical message rather than a more elaborate message integrity verification scheme. Alternatively, message integrity verification may be performed elsewhere in the system 100. For example, the system 100 may include other applications or logic (not depicted) that provide integrity verification of messages at a lower level, e.g., a TCP/IP communication interface, eliminating the need for integrity verification within the client abstraction layers 126 and 130. In exemplary embodiments, the client abstraction layer 130 identifies a desired message from one or more of the duplicate critical messages received, ignoring and/or deleting all other duplicate critical messages received. A desired message may be identified based on a message ID field. For example, the client application 128 may request a message ID of 0x01A. In response to the request, the client application 124 may send a message with a message ID of 0x01A, with duplicate messages independently transmitted through one or more of the servers 102-106 via the client abstraction layer 126. The client abstraction layer 130 may receive one or more of the duplicate critical messages from the servers 102-106. The client abstraction layer 130 can select a critical message to pass to the client application 128 based on a matching message ID (e.g., 0x01A) within the one or more duplicate critical messages. Other information related to each message may also be monitored such as a source ID (e.g., identifying the client application 124). Message management of duplicate critical messages may include monitoring and tracking the receipt of expected messages through message IDs, source IDs, and counters. As the latency of duplicate critical messages can vary between each communication path (e.g., the servers 102-106), it may be preferable to select the first duplicate critical message received at the client abstraction layer 130, thus minimizing overall communication latency.

Figure 2:
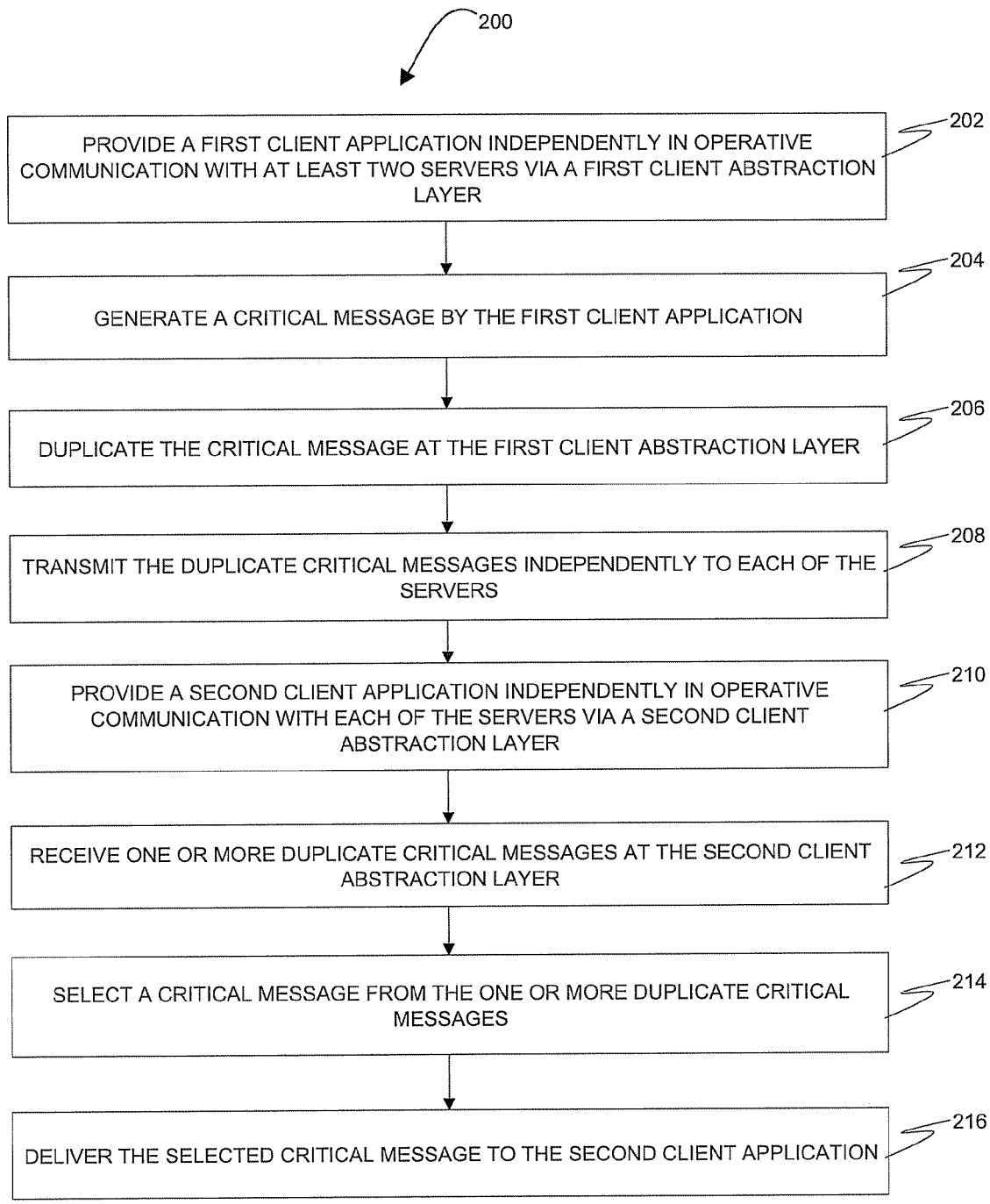
FIG. 2 is a flow diagram describing a process for implementing continuous availability of non-persistence messages in a distributed platform in exemplary embodiments.

Turning now to FIG. 2, a process for implementing continuous availability of non-persistence messages in a distributed platform will now be described in exemplary embodiments. While the process 200 of FIG. 2 is described in reference to the system 100 of FIG. 1, it will be understood that the process 200 may be performed on a variety of systems with any number of servers and/or client systems as previously described. At step 202, a first client application 124 is independently in operative communication with at least two servers via a first client abstraction layer 126. In exemplary embodiments, the first client application 124 is independently in operative communication with servers (1 to n) 102-106 via the first client abstraction layer 126, with one or more of the servers 102-106 providing a parallel path for duplicate critical messages. The independent operative communication may be established through separate communication links such that a failure in one communication path does not propagate to the other non-failed communication paths.

At step 204, the first client application 124 generates a critical message. The critical message may be dynamic, existing temporarily in the system 100 as the critical message is transported through the system 100. Dynamic (non-persistent) critical messages can be transported through the system 100 with less delay than a persistent message that involves storage and recovery/retransmission logic.

At step 206, the first client abstraction layer 126 duplicates the critical message. The message duplication may be transparent to the first client application 124, enabling the first client abstraction layer 126 to support a variable number of independent server communication connections without impacting the first client application 124. In exemplary embodiments, the first client abstraction layer 126 creates one duplicate of the critical message for each server independently in operative communication (e.g., servers 102-106). Independent communication paths through separate servers 102-106 may better isolate faults, as a failure in one server does not propagate to the remaining servers.

At step 208, the first client abstraction layer 126 transmits the duplicate critical messages independently to each of the servers. In exemplary embodiments, each server includes a message manger and a message broker, such as the message manager 112 and the message broker 114 executing on the server 102 of FIG. 1. The message manager (e.g., message managers 112, 116, or 120) may provide access to a temporary storage location for the duplicate critical message received by each server (e.g., servers 102-106). The temporary storage may be in the form of a message queue, a stack, a buffer, registers, or any temporary storage known in the art. The use of temporary storage within the servers can enable critical messages to be transmitted at different data rates or in bursts of data, as data rates may vary between transmit and receive operations. In exemplary embodiments, the message broker (e.g., message brokers 114, 118, or 122) controls message routing between the first client abstraction layer 126 and a second client abstraction layer 130.

At step 210, a second client application 128 is independently in operative communication with each of the servers via a second client abstraction layer 130. In exemplary embodiments, the second client application 128 is independently in operative communication with servers 102-106 via the second client abstraction layer 126; however, communication may be severed with any of the servers 102-106 while maintaining communication through at least one of the servers 102-106. The independent operative communication may be established through separate communication links such that a failure in one communication path does not propagate to the other non-failed communication paths. Further advantages of the independent operative communication include maintaining communication between the first and second client applications 124 and 128 when server maintenance or upgrades are performed, so long as at least one of the servers 102-106 remains in active communication with the first and second client abstraction layers 126 and 130.

At step 212, one or more of the duplicate critical messages are received at the second client abstraction layer 130. The number of duplicate critical messages received at the second client abstraction layer 130 may vary depending upon the number of servers that are independently in operative communication. For example, the first client abstraction layer 126 may send three duplicate critical messages (e.g., one to each server 102-106), but the second client abstraction layer 130 may only receive two duplicate critical messages (e.g., one from each server 102 and 104). In such a scenario, the failure of communication through the server 106 does not impede successful communication between the first and second client applications 124 and 128.

At step 214, the second client abstraction layer 130 selects a critical message from the one or more duplicate critical messages. In exemplary embodiments, the second client abstraction layer 130 compares each of the one or more duplicate critical messages to identify a matching pair of duplicate critical messages. One of the duplicate critical messages in the matching pair may be identified as the selected critical message. Using a matching pair approach minimizes message verification and integrity logic, as a simple comparison or exclusive-or (XOR) calculation can be used to identify a matching pair. If a pair of duplicate critical messages matches each other after being received from independent servers, then there is a high probability that there is no error in either message, and either message may be selected for delivery to the second client application 128. For example, duplicate critical messages from servers 102 and 104 can be cross-compared, and if both messages match, then either could be selected; otherwise, a subsequent comparison can be performed between duplicate critical messages from servers 102 and 106. The comparison process may continue until at least one matching pair of duplicate critical messages is identified or all possibilities are exhausted.

In alternate exemplary embodiments, more elaborate message integrity verification is performed on each message, such as a CRC, an LRC, a parity check, or an ECC. Integrity verification may be performed on each of the duplicate critical messages until message integrity is verified for at least one of the duplicate critical messages, referred to as a verified critical message. The verified critical message can be identified as the selected critical message. Using message integrity verification, a duplicate critical message received from the server 102 may be identified as the selected critical message upon successful verification, and the other duplicate critical messages may not be checked. However, should the duplicate critical message received from the server 102 fail verification, the duplicate critical message received from the server 104 may then be verified, as both duplicate critical messages may be available to the second client abstraction layer 130. The message integrity verification process may continue until at least one of the duplicate critical messages is verified or all possibilities are exhausted.

In alternate exemplary embodiments, the second client abstraction layer 130 may check one or more of the received duplicate critical messages for a message ID. For example, should a duplicate critical message received from the server 102 include an expected message ID, then the duplicate critical message may be selected. Duplicate critical messages received from each server (e.g., servers 102-106) can be checked for the expected message ID, selecting the first duplicate critical message with a matching message ID (e.g., received matches expected). Checking message IDs may include message integrity verification as previously described, or a matching message ID may be deemed sufficient for message selection. The use of message ID matching without message integrity verification may be preferred in systems with a low bit error rate and/or systems that include error detection/correction at a lower level of software or hardware, reducing the need for additional message integrity verification logic within the first and second client abstraction layers 126 and 130.

In exemplary embodiments, once a critical message has been selected from the duplicate critical messages, all duplicate critical messages except for the selected critical message are deleted. Message deletion may include removing or resetting a reference pointer to each non-selected duplicate critical message. Alternatively, message deletion may include zeroing or otherwise altering the contents of each of the non-selected duplicate critical messages.

At step 216, the second client abstraction layer 130 delivers the selected critical message to the second client application 128. The second client application 128 may use the selected critical message for a variety of tasks, such as control functions, equipment monitoring and diagnosis, or coordinating tasks in a manufacturing environment. The selected critical message may be received by the second client application 128 based on a request, in response to an event (e.g., fault condition or interrupt), or result from a scheduled task (e.g., real-time scheduler).

In exemplary embodiments, numerous communication models are supported between the first and second client applications 124 and 128 by the message brokers 114, 118, and 122. The system 100 of FIG. 1 may support either or both of a source-target mode and a subscriber-publisher mode for communication of a critical message. In exemplary embodiments, the first client application 124 is a source application and the second client application 128 is a target application, the source application directing the critical message specifically to the target application. In alternate exemplary embodiments, the first client application 124 is a publisher application and the second client application 128 is a subscriber application, the publisher application making the critical message available to each server and the subscriber application requesting the critical message from each server. The first and second client applications 124 and 128 may switch roles, such that, for example, the first client application 124 is the target application and the second client application 128 is the source application. Similarly, the first client application 124 may be the subscriber application and the second client application 128 may be the publisher application.

Technical effects and benefits of exemplary embodiments include providing continuous availability of non-persistence messages in a distributed platform. By sending duplicate critical messages between client applications through multiple servers in parallel, system availability and reliability may be improved while maintaining real-time or near real-time communication. Utilizing a client abstraction layer to interface with a client application, independent communication can be realized through multiple servers transparently between multiple client applications. The client abstraction layer can be linked with an existing API, such as an MQ API, in the form of a linked library or an equivalent, without modifying the client application that utilizes the existing API, thus providing transparency to the client application. Employing multiple servers enables a server upgrade or maintenance (e.g., hardware or software modification) to occur without halting communication between client applications communicating via the multiple servers. Providing one or more duplicate copies of a critical message at a receiving client abstraction layer enables communication failure accommodation through selection from the duplicate critical messages without the large delay associated with other techniques such as persistence messages or HACMP. Single point failures may be eliminated through redundancy of duplicate critical messages.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for communicating a critical message, the method comprising:
   providing a first client application independently in operative communication with at least two servers via a first client abstraction layer;
   generating a critical message by the first client application;
   duplicating the critical message at the first client abstraction layer for each of the servers;
   transmitting the duplicate critical messages independently to each of the servers;
   providing a second client application independently in operative communication with each of the servers via a second client abstraction layer;
   receiving one or more of the duplicate critical messages at the second client abstraction layer;
   selecting a critical message from the one or more duplicate critical messages; and
   delivering the selected critical message to the second client application.

2. The method of claim 1 wherein selecting a critical message from the one or more duplicate critical messages further comprises:
   comparing each of the one or more duplicate critical messages to identify a matching pair of duplicate critical messages; and
   identifying one of the duplicate critical messages in the matching pair as the selected critical message.

3. The method of claim 1 further comprising:
   deleting all of the one or more duplicate critical messages except for the selected critical message.

4. The method of claim 1 wherein the first client application is a source application and the second client application is a target application, the source application directing the critical message specifically to the target application.

5. The method of claim 1 wherein the first client application is a publisher application and the second client application is a subscriber application, the publisher application making the critical message available to each server and the subscriber application requesting the critical message from each server.

6. The method of claim 1 wherein each server includes:
   a message manager, the message manager providing a temporary storage location for the duplicate critical messages received by each server; and
   a message broker, the message broker controlling message routing between the first client abstraction layer and the second client abstraction layer.

7. The method of claim 1 wherein selecting a critical message from the one or more duplicate critical messages further comprises:
   performing integrity verification on each of the one or more duplicate critical messages until message integrity is verified for at least one of the one or more duplicate critical messages, as a verified critical message; and
   identifying the verified critical message as the selected critical message.

8. The method of claim 1 wherein selecting a critical message from the one or more duplicate critical messages further comprises:
   checking a message ID in each of the one or more duplicate critical messages until a message ID matching an expected message ID is identified as the selected critical message.

9. A system for communicating a critical message, the system comprising:
   two or more servers;
   a first client system, the first client system executing a first client application, the first client application independently in operative communication with the servers via a first client abstraction layer, the first client application generating a critical message, the first client abstraction layer performing a method, the method comprising:
      duplicating the critical message for each of the servers; and
      transmitting the duplicate critical messages independently to each of the servers; and
   a second client system, the second client system executing a second client application, the second client application independently in operative communication with the servers via a second client abstraction layer, the second client abstraction layer performing a method, the method comprising:
      receiving one or more of the duplicate critical messages;
      selecting a critical message from the one or more duplicate critical messages; and
      delivering the selected critical message to the second client application.

10. The system of claim 9 wherein selecting a critical message from the one or more duplicate critical messages further comprises:
    comparing each of the one or more duplicate critical messages to identify a matching pair of duplicate critical messages; and
    identifying one of the duplicate critical messages in the matching pair as the selected critical message.

11. The system of claim 9 further comprising:
    deleting all of the one or more duplicate critical messages except for the selected critical message.

12. The system of claim 9 further comprising performing communication between the first and second client applications in at least one of a source-target mode and a subscriber-publisher mode.

13. The system of claim 9 wherein each server further includes:
    a message manager, the message manager providing a temporary storage location for the duplicate critical message received by each server; and
    a message broker, the message broker controlling message routing between the first client abstraction layer and the second client abstraction layer.

14. The system of claim 9 wherein selecting a critical message from the one or more duplicate critical messages further comprises:

performing integrity verification on each of the one or more duplicate critical messages until message integrity is verified for at least one of the one or more duplicate critical messages, as a verified critical message; and identifying the verified critical message as the selected critical message.

15. The system of claim 9 wherein selecting a critical message from the one or more duplicate critical messages further comprises:

checking a message ID in each of the one or more duplicate critical messages until a message ID matching an expected message ID is identified as the selected critical message.

16. A computer program product for transmitting and receiving a critical message between a first and second client application, the first client application independently in operative communication with at least two servers via a first client abstraction layer, and the second client application independently in operative communication with each of the servers via a second client abstraction layer, the computer program product including instructions for causing a computer to implement a method, comprising:

receiving a critical message from the first client application at the first client abstraction layer;

duplicating the critical message for each of the servers at the first client abstraction layer;

transmitting the duplicate critical messages from the first client abstraction layer independently to each of the servers;

receiving at the first client abstraction layer one or more duplicate critical messages from the second client abstraction layer;

selecting a critical message from the one or more duplicate critical messages; and delivering the selected critical message to the first client application.

17. The computer program product of claim 16, wherein selecting a critical message from the one or more duplicate critical messages further comprises:

comparing each of the one or more duplicate critical messages to identify a matching pair of duplicate critical messages;

identifying one of the duplicate critical messages in the matching pair as the selected critical message; and deleting all of the one or more duplicate critical messages except for the selected critical message.

18. The computer program product of claim 16 further comprising instructions for performing communication between the first and second client applications in at least one of a source-target mode and a subscriber-publisher mode.

19. The computer program product of claim 16, wherein selecting a critical message from the one or more duplicate critical messages further comprises:

performing integrity verification on each of the one or more duplicate critical messages until message integrity is verified for at least one of the one or more duplicate critical messages, as a verified critical message;

identifying the verified critical message as the selected critical message; and deleting all of the one or more duplicate critical messages except for the selected critical message.

20. The computer program product of claim 16, wherein selecting a critical message from the one or more duplicate critical messages further comprises:

checking a message ID in each of the one or more duplicate critical messages until a message ID matching an expected message ID is identified as the selected critical message; and deleting all of the one or more duplicate critical messages except for the selected critical message.

* * * * *